UNITED STATES PATENT OFFICE.

FRANK P. HARNED, OF MERCHANTVILLE, NEW JERSEY, ASSIGNOR TO THE WARREN MANUFACTURING COMPANY, OF SAME PLACE.

METHOD OF PREPARING CAST ASTRINGENT PENCILS.

SPECIFICATION forming part of Letters Patent No. 497,659, dated May 16, 1893.

Application filed December 12 1892. Serial No. 454,930. (No specimens.)

*To all whom it may concern:*

Be it known that I, FRANK P. HARNED, a citizen of the United States, residing at Merchantville, in the county of Camden and State of New Jersey, have invented certain new and useful Improvements in Methods of Producing Cast Astringent Pencils or Sticks, of which the following is a specification.

My invention relates to the production of a cast astringent pencil or stick for contracting or crisping cuts, abrasions or punctures of the skin.

The principal objects of my invention are first, to convert lumpy, honey-combed and rough sulphate of alumina into solid smooth sulphate of alumina adapted for direct application to the body and having the convenient form for its employment as a styptic; second, to provide a smooth, imporous cast astringent pencil or stick possessing superior healing qualities and one far more efficacious than any material hitherto employed in application to cuts, fever-blisters or abrasions of the skin; third, to provide a cast astringent pencil or stick that will not discolor or irritate the most sensitive skin; fourth, to provide a cast astringent pencil or stick composed of sulphate of alumina rendered by treatment solid and imporous; and fifth, to provide an economical and expeditious method of producing the same.

My invention further consists of the method of making a cast astringent pencil or stick composed of sulphate of alumina.

Having pointed out the nature and characteristic features of my invention, a description will now be given of a method found practically efficient for the production for the first time from porous honey-comed sulphate of alumina of a cast astringent pencil or stick composed in whole or in part of solid and imporous sulphate of alumina.

A quantity of commercial sulphate of alumina is placed in a steam vessel and sufficient water is added thereto to cover the same. Steam is then turned on and evaporation is carried on until the desired density for the pencil or stick is obtained. This point is reached when pure sulphate of alumina is obtained, that is, when about eighteen equivalents of water is combined with the sulphate of alumina. In order to attain this point steam at about seventy pounds pressure is required. At this point is added a small quantity of caustic soda in solution, sufficient in quantity to produce two (2 %) per cent. more or less, of basicity. The mass in solution is then in condition to be cast in molds. The heat is required to be kept up during the casting operation and in order to prevent further evaporation of the mass and any tendency to decomposition setting in, a solution of sulphate of alumina of about 60° Baumé is kept at hand, and added at stated intervals in regulated quantity to keep the mass uniform. This is essential because any great excess of water over that of crystallization would cause the sulphate of alumina to become plastic and in casting in the molds would adhere to the sides or surfaces thereof in such manner as to render it next to impossible to remove the same therefrom. Moreover, if evaporation is carried on beyond the point mentioned decomposition will set in and the mass become unmanageable.

It may be remarked that by decomposition is not necessarily implied a total destruction or anhydration of the mass, but any evaporation of the water of crystallization gives a resultant unmanageable mass, which renders subsequent casting thereof in a mold and removal therefrom exceedingly difficult, because of the uniform adherence of the same to the sides or surfaces of the mold.

After preparing the solution of sulphate of alumina in the manner explained, it is cast in a two-part mold. At the points of union of the two parts of the mold, the form of the cavity is slightly deviated from, so as to be in form elliptical in order to permit of the ready removal of the pencil or stick therefrom. The construction of the mold is of the utmost importance for ordinary two-part molds are not adapted to the purpose, for the reason that the natural tendency of the material is to stick or adhere to the surfaces thereof. It has hitherto been generally understood that it was impossible to fuse and cast sulphate of alumina, because of its tendency to decompose by heat and when it was obtained by evaporation it was honey-combed, rough and lumpy. Many attempts have in the past been made to effect a change of the constitution of this lumpy, porous and rough material to adapt it for direct application to the body in a fused and cast state, but without success. Hitherto its use has been restricted to the employment of the same in a granular form or in a hydrated condition. However, after many costly experiments and notwithstanding the rough, porous and honey-combed nature of the material and the fact that the material is subject to decomposition by the action of heat, it has been found, that by fusing the material in the manner explained and then pouring the same into a particularly constructed mold, a perfectly solid product can be obtained and such a pencil or stick as can be readily removed from the mold when cool or perfectly cold. In this connection it may be remarked that whatever type of mold is used, it is necessary in order to avoid adherence of the material to the sides or surfaces thereof to grease the same preparatory to the pouring of the material into the mold and several different kinds of oils have been employed in this connection without obtaining satisfactory results until in the more extended practice of the invention a fine vegetable oil was employed, when it was found that the cast sticks or pencils could be readily removed in a perfect condition from the mold, provided the mass was rendered basic before pouring the same into the greased mold and also that casting of the mass in such a mold was rapidly effected.

The cast article of sulphate of alumina by the foregoing treatment is rendered solid, compact and smooth, so that it does not injure a wound, cut or other diseased part upon direct application thereto, and in such form it can be conveniently applied without the least fear of irritation of the skin.

It may be further remarked with respect to the manufacture of such cast pencils or sticks that the use of sulphate of alumina is hereinbefore referred to as being used with about eighteen (18) equivalents of water, and in this connection it may be stated that if the product contains water in excess of the water of crystallization it will in time evaporate or dry out in such manner as that the pencil or stick will loose its shape and consequently be an unmarketable product.

The pencils or sticks may be produced by adding while the sulphate of alumina is in a fused condition, earthy matter, as china clay or talc, sulphate of lime or similar material or substances. It is, however, preferred to make the cast pencils or sticks simply of sulphate of alumina and in a pure state or condition.

A cast astringent pencil or stick of solid, smooth and imporous sulphate of alumina possesses obvious advantages over a hydrated solution of sulphate of alumina or in a porous or honey-combed state and which adapt the material itself in such form to many new uses, for example, for the use of barbers and shavers. It may, however, be remarked that there are many other new uses to which the same is adapted in medicine, which could be mentioned, if it were deemed necessary so to do.

Having thus described the nature and objects of my invention, what I claim as new, and desire to secure by Letters Patent, is—

1. The method of producing a cast astringent pencil or stick composed in whole or in part of sulphate of alumina, which consists in reducing the mass under steam pressure to the required density and basicity and maintaining the same uniform by additions thereto and casting in a greased appliance to form a smooth and imporous structure, substantially as and for the purposes set forth.

2. The method of producing a cast astringent pencil or stick composed of sulphate of alumina, which consists in reducing the material in solution under steam pressure to obtain the required density and basicity of the mass and preventing further evaporation or tendency to decomposition by adding at intervals sulphate of alumina in solution at or about a certain degree Baumé to maintain said mass uniform and to prevent the same adhering to a greased appliance in the casting thereof and then removing the smooth and imporous cast structure therefrom, substantially as and for the purposes set forth.

In testimony whereof I have hereunto set my signature in the presence of two subscribing witnesses.

FRANK P. HARNED.

Witnesses:
THOMAS M. SMITH,
RICHARD C. MAXWELL.